Oct. 25, 1932.  T. ZUSCHLAG.  1,884,496

ELECTRICAL PROSPECTING APPARATUS

Filed May 31, 1929

INVENTOR
Theodor Zuschlag
BY
ATTORNEYS

Patented Oct. 25, 1932

1,884,496

UNITED STATES PATENT OFFICE

THEODOR ZUSCHLAG, OF NEW YORK, N. Y., ASSIGNOR TO SWEDISH AMERICAN PROSPECTING CORPORATION, OF NEW YORK, N. Y., A CORPORATION OF NEW YORK

ELECTRICAL PROSPECTING APPARATUS

Application filed May 31, 1929. Serial No. 367,542.

This invention relates to electrical prospecting apparatus. More particularly, it relates to alternating current prospecting apparatus, and has for its object the provision of improved apparatus of this character enabling the attainment of various new and improved results.

It is well known that the nature of electrical or electromagnetic ground fields is dependent upon such geoelectrical constants as the conductivity and permeability of the ground area in which the fields exist. In consequence systems of electrical prospecting have been developed wherein data on the geological structure of a given ground area is obtained by the systematic investigation of a ground field artificially induced in the area for the purpose.

In the systems of prospecting now in use, both alternating and direct current apparatus are employed to generate the ground field. When direct current is used, the investigation of the ground field need be made only in respect to its magnitude or strength, usually expressed as the amplitude of the E. M. F. induced by it in a searching coil. When alternating current is used, on the other hand, an investigation, to be complete, must, in addition to a determination of the amplitude of the induced E. M. F., include also a determination of the phase relation between the exciter field, set up to induce the ground field, and the ground field itself.

For practical reasons, the data on the amplitude and phase is usually expressed as a function of the exciter field circuit, which therefore makes it necessary to establish some form of relation or connecting link between the exciter field circuit and the investigating or search circuit.

The present invention concerns the provision of an improved form of alternating current prospecting apparatus wherein the exciter and search circuits are incorporated with a compensating or interconnecting circuit in such manner as to permit the determination of the amplitude of the E. M. F. induced by a ground field as well as the phase relation of the ground field to the exciter field. Generally speaking, such improved apparatus may be used in either potential or electromagnetic investigations and includes suitable means for determining the magnitude and phase relation of the investigated ground field on the basis of the exciter circuit current.

More particularly, the present invention concerns the provision, in conjunction with exciter and search circuits, of two alternating current generators coupled to one another and to a prime mover in such a manner that while both rotate at the same speed and generate E. M. F.'s of equal value, the phase of the E. M. F. of one of them may be varied with respect to that of the other without causing any change in the amplitude of the two E. M. F.'s. One of the generators is connected to the exciter circuit, such as exciter electrodes or an exciter loop, and the other generator is connected through a potentiometer to the search circuit, which may comprise search electrodes or a search coil or loop in series with a suitable indicating device.

Accordingly, with the apparatus connected as described, the establishment of an exciter field by the exciter circuit will result in the production of a ground field which will induce an E. M. F. in the search circuit. By means of the indicating device this induced E. M. F. can be observed, amplification being resorted to if necessary.

Through the interposition of the potentiometer between the search circuit and one of the generators, the induced E. M. F. in the search circuit can be balanced by deriving the proper value of E. M. F. necessary for balance from the E. M. F. of the generator. If the induced E. M. F. and the balancing E. M. F. are of the same phase, which seldom is the case, phase adjustment of the generator is unnecessary. On the other hand, if the two E. M. F.'s are out of phase, the phase of the generator providing the balancing E. M. F. can be adjusted or varied until the two E. M. F.'s, the induced and balancing, are alike in phase as well as in amplitude, at which time the indicating device will indicate a balance. Both the amplitude and the phase displacement of the balancing E. M. F. can be readily determined and with this information the phase relation and amplitude of the E. M. F. of the investigated ground field may be obtained.

In order that the invention may be better understood, reference is made to the accompanying drawing, wherein.

Figure 1:
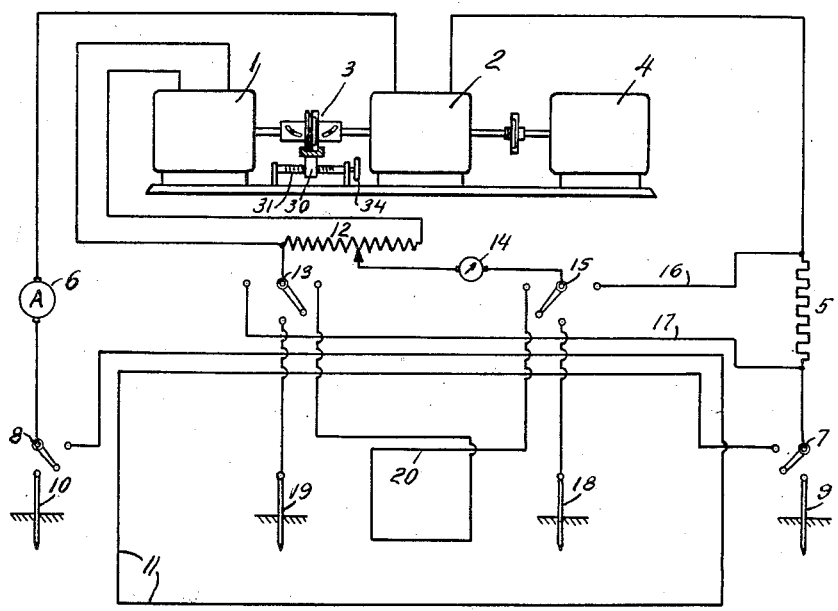
Fig. 1 is a representation of apparatus in accordance with the invention.

Considering the drawings more in detail, two identical alternating current generators 1 and 2, are coupled to one another at 3 and to a prime mover 4, such as a gasoline or electric motor. The output of generator 2 is connected through a non-inductive resistance 5 of known value and an ammeter 6 to the switches 7 and 8, whereby connection with an exciter circuit constituted either by electrodes 9 and 10 or a loop 11 may be established.

The output of the generator 1 is connected across a potentiometer resistance 12. One end of the potentiometer is connected to switch 13 and the potentiometer slider is connected through an indicating device 14 to switch 15. By means of the switches 13 and 15, the potentiometer output may be connected by leads 16 and 17 across the resistance 5, as will be subsequently described, or to a search circuit formed either by electrodes 18 and 19 or search coil 20.

Figure 2:
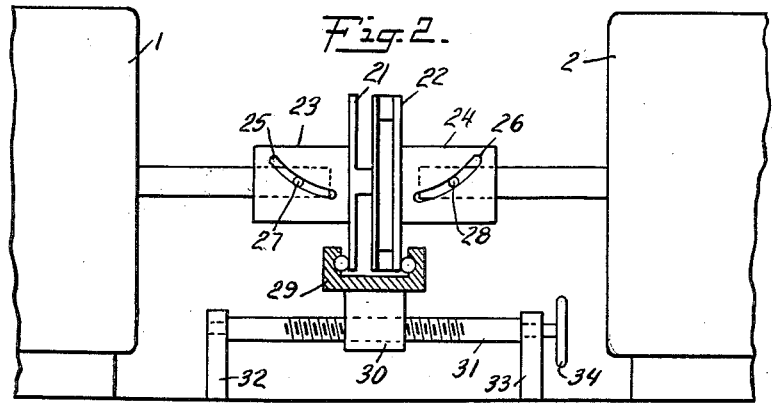
Fig. 2 is a view in a larger scale showing a detail of the apparatus of Fig. 1.

As shown on an enlarged scale in Fig. 2, the coupling device 3 connecting the two generators together, comprises coupling discs 21 and 22 each provided with a cylindrical hub 23, 24, having a cam slot 25, 26 therein. The hubs 23, 24 are axially slidable on the generator shafts, driving being effected through pins 27, 28 mounted on the shafts and extending through the slots.

Engaging the discs 21, 22 along their peripheries is a guide block 29 carried by a travelling nut 30 mounted on a screw 31 supported by suitable end bearings 32, 33 and provided with an operating handle or dial 34. To reduce friction between the peripheries of the discs and the guide block, ball bearings 35 may be provided.

When the screw 31 is turned by means of the handle 34, the nut 30 is caused to move to the right or left carrying with it the guide block 29. The discs 21, 22 will thereby be forced to the right or left, and because of the pins 27, 28 projecting through the slots 25, 26, such movement will cause the shafts to be angularly displaced with respect to one another. The rotors of the two generators accordingly will take on a displaced relation, and this results in a corresponding displacement in the phase of their E. M. F.'s.

Figure 3:
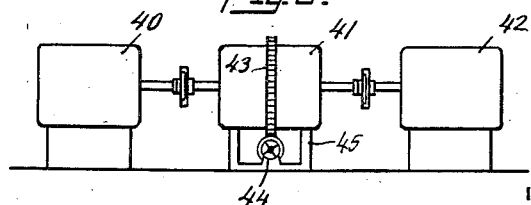
Fig. 3 is a detail view showing a modification of the construction shown in Fig. 2.

Another arrangement whereby the phase of the two generators may be relatively varied is shown in Fig. 3. In this arrangement, the shafts of the generators 40, 41 are rigidly coupled together and to a prime mover 42, and one of the generators 41 is so mounted that its stator may be rotated about its axis by means of a suitable gear ring 43 mounted on the generator casing and meshing with an operating worm 44. For small generators, the shafts may be relied upon to carry the weight of the rotatable generator casing, but for apparatus of larger size, a suitable cradle 45 may be provided for supporting the generator 41.

Assuming the apparatus to be placed in operation with the generator 2 connected to the exciter electrodes 9 and 10 and the generator 1 connected through the potentiometer 12 to the search coil 20, the indicating device 14 will show a pronounced deflection due to the voltage drop across the portion of the potentiometer resistance 12 in the search circuit and also to the E. M. F. induced in the search coil 20. By adjusting the potentiometer slider and turning the handle 34 of the coupling device 3, the indicating device can be restored to its zero position, at which point, the voltage drop is equal to the induced E. M. F. and the voltage of generator 1 is in phase with the induced voltage.

Accordingly the value of the induced voltage $E_{20}$ may be expressed as:

$$E_{20} = i_1 a$$

where
$i_1$ = current flowing the potentiometer
$a$ = potentiometer resistance between switch 13 and the slider.

In the foregoing equation the induced voltage is expressed as a function of the current $i_1$. In practice, however, it is preferred to express the value of $E_{20}$ in terms of the current flowing in the exciter circuit, in this case, the electrodes 9 and 10.

To obtain this relationship, the switches 13 and 15 are changed to connect the resistance 5 in circuit across the potentiometer instead of the search coil 20. The same operation of balancing the indicator to zero is then repeated.

The voltage drop $E_5$ across the resistance 5 can then be expressed as;

$$E_s = i_2 \ r_5 = i_1 b$$

where
- $i_2$ = current flowing in the exciter circuit
- $r_5$ = value of the resistance 5
- $i_1$ = current flowing through potentiometer
- $b$ = potentiometer resistance between switch 13 and the slider.

From the foregoing equation the value of the current $i_1$ can be expressed as, $$i_1 = \frac{i_2 r_5}{b}$$

Substituting this value of $i$, in the first equation:

$$E_{20} = \frac{a}{b} i_2 r_5$$

when $E_{20}$ will be expressed in terms of the exciter current $i_2$. The value of $r_5$ being known and constant as previously explained, the values of $a$, $i_2$ and $b$ can be readily determined from the scale of the potentiometer and the scale of the ammeter and the value of $E_{20}$ obtained.

In order to determine the phase displacement between the induced E. M. F. and the exciter voltage it is only necessary to subtract the readings of the dial 34, which, for practical purpose, may be graduated in degrees. Thus, if the dial reading for the first compensation or balancing operation was $\alpha_1$ and the dial reading for the second balancing operation was $\alpha_2$, then the phase displacement $\varphi$ will be given as $$\varphi = \alpha_1 - \alpha_2$$

In the foregoing explanation, it has been pointed out that the exciter circuit was connected to electrodes and the search circuit to a loop. It is not necessary to the invention, however, that this arrangement be used. Each of the circuits may be connected to electrodes or to loops, or one may be connected to a loop and the other to electrodes; the apparatus is applicable equally as well to one form as to another.

I claim:—

1. Electrical prospecting apparatus comprising an exciter circuit for setting up an artificial ground field, a source of alternating E. M. F. connected to said exciter circuit, a search circuit, a second source of alternating E. M. F. of the same frequency connected to said search circuit, said second source of alternating current being coupled mechanically with said first source of alternating current in such a way that the phase of said second source may be varied in an arbitrary manner.

2. Electrical prospecting apparatus according to claim 1, in which means are provided for varying the value of the E. M. F. supplied by said second source of alternating E. M. F. to said search circuit.

3. Electrical prospecting apparatus according to claim 1, in which means are provided for indicating when the value and the phase of the E. M. F induced in the search circuit by said artificial ground field equals the E. M. F. supplied to said search circuit from said second source of alternating current.

4. In an electrical prospecting apparatus, the combination comprising an exciter circuit, a search circuit, two alternating current generators coupled to one another and to a prime mover so that when both rotate at the same speed and generate E. M. F.'s of equal value to the phase of the E. M. F. of one of the generators may be varied with respect to the E. M. F. of the other without causing any change in amplitude of the two E. M. F.'s.

5. An electrical prospecting apparatus according to claim 4, in which one of the generators is connected to the exciter circuit and the other generator is connected through a potentiometer to the search circuit.

In testimony whereof I affix my signature.

THEODOR ZUSCHLAG.

CERTIFICATE OF CORRECTION.

Patent No. 1,884,496.                                      October 25, 1932.

THEODOR ZUSCHLAG.

It is hereby certified that error appears in the printed specification of the above numbered patent requiring correction as follows: Page 1, line 36, for "circuit" read "current"; page 3, line 77, claim 4, strike out the word "to"; and that the said Letters Patent should be read with these corrections therein that the same may conform to the record of the case in the Patent Office.

Signed and sealed this 27th day of December, A. D. 1932.

(Seal)

M. J. Moore,
Acting Commissioner of Patents.